US012682629B2

(12) United States Patent
Li et al.

(10) Patent No.:  US 12,682,629 B2
(45) Date of Patent:  Jul. 14, 2026

(54) DEVICE AND METHOD FOR DETERMINING AN ENCODER CONFIGURED IMAGE ANALYSIS

(71) Applicant: Robert Bosch GmbH, Stuttgart (DE)

(72) Inventors: Yumeng Li, Tuebingen (DE); Anna Khoreva, Stuttgart (DE); Dan Zhang, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 320 days.

(21) Appl. No.: 18/485,174

(22) Filed: Oct. 11, 2023

(65) Prior Publication Data

US 2024/0135699 A1     Apr. 25, 2024

(30) Foreign Application Priority Data

Oct. 17, 2022    (EP) ..................................... 22201998

(51) Int. Cl.
*G06V 10/82*          (2022.01)
*G06V 10/764*         (2022.01)
(52) U.S. Cl.
CPC ............ *G06V 10/82* (2022.01); *G06V 10/764* (2022.01)
(58) Field of Classification Search
CPC ...... G06V 10/764; G06V 10/82; G06V 10/00; G06V 20/00; G06V 40/00; G06V 30/10; G06V 10/10; G06V 10/20; G06V 10/40; G06V 10/70; G06V 10/88; G06V 10/98; G06V 20/70; G06V 20/80; G06V 20/90; G06V 30/12; G06V 30/16; G06V 30/14;
(Continued)

(56) References Cited

U.S. PATENT DOCUMENTS 10,726,525 B2 *  7/2020  El-Khamy ................ G06T 5/70
11,537,881 B2 *  12/2022  Choi ...................... G06N 3/088
(Continued)

FOREIGN PATENT DOCUMENTS

EP          3739515 A1 *  11/2020  ......... G06F 18/2433
EP          3477553 B1 *  8/2023   ........... G06N 3/0455

OTHER PUBLICATIONS

Weihao Xia et al.,"GAN Inversion: A Survey,"Jun. 9, 2022, IEEE Transactions On Pattern Analysis and Machine Intelligence, vol. 45, No. 3, Mar. 2023, pp. 3121-3133.*

(Continued)

*Primary Examiner* — Omar S Ismail
(74) *Attorney, Agent, or Firm* — NORTON ROSE FULBRIGHT US LLP

(57)                ABSTRACT

A computer-implemented method for training an encoder. The encoder is configured for determining a latent representation of an image. Training the encoder includes: determining a latent representation and a noise image by providing a training image to the encoder, wherein the encoder is configured for determining a latent representation and a noise image for a provided image; masking out parts of the noise image, thereby determining a masked noise image; determining a predicted image by providing the latent representation and the masked noise image to a generator of a generative adversarial network; training the encoder by adapting parameters of the encoder based on a loss value, wherein the loss value characterizes a difference between the predicted image and the training image.

14 Claims, 12 Drawing Sheets

(58) Field of Classification Search

CPC ...... G06V 30/18; G06V 30/19; G06V 30/199;
G06V 30/24; G06V 30/28; G06V 30/26;
G06V 40/70; G06V 40/60

See application file for complete search history.

(56) References Cited

U.S. PATENT DOCUMENTS

| | | | | |
|---|---|---|---|---|
| 11,551,034 | B2 * | 1/2023 | Karimi | G06V 30/226 |
| 11,763,135 | B2 * | 9/2023 | Wang | G06N 3/0455 |
| | | | | 382/156 |
| 2020/0349393 | A1 * | 11/2020 | Zhong | G06N 3/0455 |
| 2020/0372308 | A1 * | 11/2020 | Anirudh | G06N 3/08 |
| 2021/0118099 | A1 * | 4/2021 | Kearney | A61B 6/5217 |
| 2022/0245451 | A1 * | 8/2022 | Arik | G06N 3/0455 |
| 2023/0377213 | A1 * | 11/2023 | Naruniec | G06V 10/77 |
| 2024/0013441 | A1 * | 1/2024 | Le | G06T 3/40 |
| 2024/0078726 | A1 * | 3/2024 | Weber | G06V 40/172 |

OTHER PUBLICATIONS

Yiping Gao et al.,"A Generative Adversarial Network Based Deep Learning Method for Low-Quality Defect Image Reconstruction and Recognition," Jul. 13, 2020, IEEE Transactions on Industrial Informatics, vol. 17, No. 5, May 2021, pp. 3231-3238.*

Tero Karras et al.,"Analyzing and Improving the Image Quality of StyleGAN," Jun. 2020, Proceedings of the IEEE/CVF Conference on Computer Vision and Pattern Recognition (CVPR), 2020, pp. 8110-8116.*

Yu Li et al.,"Asymmetric GAN for Unpaired Image-to-Image Translation," Jun. 19, 2019, IEEE Transactions on Image Processing, vol. 28, No. 12, Dec. 2019, pp. 5881-5894.*

Changhee Han et al.,"Combining Noise-to-Image and Image-to-Image GANs: Brain MR Image Augmentation for Tumor Detection," Oct. 15, 2019, IEEEAccess, vol. 7, 2019,pp. 156966-156974.*

Han Zhang et al.,"Cross-Modal Contrastive Learning for Text-to-Image Generation," Jun. 2021, Proceedings of the IEEE/CVF Conference on Computer Vision and Pattern Recognition (CVPR), 2021, pp. 833-840.*

Elad Richardson et al.,"Encoding in Style: a StyleGAN Encoder for Image-to-Image Translation," Jun. 2021, Proceedings of the IEEE/CVF Conference on Computer Vision and Pattern Recognition (CVPR), 2021, pp. 2287-2293.*

Nan Liang et al.,"End-To-End Retina Image Synthesis Based on CGAN Using Class Feature Loss and Improved Retinal Detail Loss," Aug. 4, 2022, IEEEAccess, vol. 10, 2022,pp. 83125-83133.*

Zhen Qin et al.,"Segmentation mask and feature similarity loss guided GAN for object-oriented image-to-image translation," Apr. 4, 2022, Information Processing and Management 59 (2022),pp. 1-14.*

Vu Nguyen et al.,"Shadow Detection with Conditional Generative Adversarial Networks," Oct. 2017, Proceedings of the IEEE International Conference on Computer Vision (ICCV), 2017,pp. 4510-4516.*

Atiye Sadat Hashemi et al.,"Secure deep neural networks using adversarial image generation and training with Noise-GAN," Jul. 2, 2019, Computers and Security 86( 2019) , pp. 372-384.*

Xia et al., "GAN Inversion: a Survey," IEEE Transactions on Pattern Analysis and Machine Intelligence, 2021, pp. 1-21.

Richardson et al., "Encoding in Style: a Stylegan Encoder for Image-to-Image Translation," Proceedings of the IEEE/CVF Conference on Computer Vision and Pattern Recognition (CVPR), 2021, pp. 2287-2296. <https://openaccess.thecvf.com/content/CVPR2021/papers/Richardson_Encoding_in_Style_A_StyleGAN_Encoder_for_Image-to-Image_Translation_CVPR_2021_paper.pdf> Downloaded Oct. 11, 2023.

Karras et al., "A Style-Based Generator Architecture for Generative Adversarial Networks," 2019 IEEE/CVF Conference on Computer Vision and Pattern Recognition (CVPR), 2019, pp. 4396-4405. <https://sci-hub.ru/10.1109/cvpr.2019.00453> Downloaded Oct. 11, 2023.

Karras et al., "Analyzing and Improving the Image Quality of StyleGAN," 2020 IEEE/CVF Conference on Computer Vision and Pattern Recognition (CVPR), 2020, pp. 8107-8116. <https://sci-hub.ru/10.1109/cvpr42600.2020.00813> Downloaded Oct. 11, 2023.

Zhang et al., "The Unreasonable Effectiveness of Deep Features as a Perceptual Metric," 2018 IEEE/CVF Conference on Computer Vision and Pattern Recognition, 2018, pp. 586-595. <https://sci-hub.ru/10.1109/cvpr.2018.00068> Downloaded Oct. 11, 2023.

* cited by examiner

DEVICE AND METHOD FOR DETERMINING AN ENCODER CONFIGURED IMAGE ANALYSIS

CROSS REFERENCE

The present application claims the benefit under 35 U.S.C. § 119 of European Patent Application No. EP 22 20 1998.6 filed on Oct. 17, 2022, which is expressly incorporated herein by reference in its entirety.

FIELD

The present invention relates to a computer implemented method for training an encoder, a method for determining an augmentation of an image, a method for training a machine learning system, a method for determining a control signal, a training system, a control system, a computer program, and a computer-readable storage medium.

BACKGROUND INFORMATION

Richardson et al. "Encoding in Style: a StyleGAN Encoder for Image-to-Image Translation", 2021, https:// arxiv.org/pdf/2008.00951.pdf describes a generic image-to-image translation framework.

Karras et al. "A style-based generator architecture for generative adversarial networks", 2019, https://arxiv.org/pdf/1812.04948.pdf describes StyleGAN, a neural network architecture that leads to an automatically learned, unsupervised separation of high-level attributes and stochastic variation in the generated images.

Karras et al. "Analyzing and Improving the Image Quality of StyleGAN", 2020, https://arxiv.org/pdf/1912.04958.pdf describes StyleGAN2, an improvement over the StyleGAN neural network.

Zhang et al. "The Unreasonable Effectiveness of Deep Features as a Perceptual Metric", 2018, https://arxiv.org/pdf/1801.03924.pdf describes the Learned Perceptual Image Patch Similarity (LPIPS) metric.

Automatically analyzing latent factors of an image is a task practitioners are face with in a plurality of fields of technology. While determining images from latent representations can be readily achieved, e.g., by neural networks known as generative adversarial networks (GAN), the opposite direction, i.e., finding a latent representation for a given image, remains a challenging problem. Especially when considering machine learning systems, discovering such latent factors is a problem that would be desirable to solve as the solution allows for augmenting existing datasets for training a machine learning system with respect to semantic aspects encoded in an image. For example, a latent factor of an image could be the weather situation currently depicted in the image. By adapting a value of this latent factor and feeding the adapted latent representation to a GAN, one could create augmentations characterizing different weather situations for the given image. These augmentations could then be used for training a machine learning system. As the machine learning system would be trained with more diverse data with respect to latent factors, e.g., semantic factors, of the images used for training, a performance of the machine learning system with respect to classification and/or regression analysis could be improved.

The process of determining latent factors with respect to images can be achieved based on GANs. Such methods are also referred to as a "GAN inversion" in the art. Previous works for GAN inversion have shown promising results on simple face datasets such as FFHQ. Using a GAN generator, Richardson et al. describe to train encoder to extract features from a given image and map these features to intermediate latent variables, where the latent variables can be used for image manipulation, e.g., changing hair color and other facial details. However, when it comes to datasets with higher structure complexity, e.g., driving scene datasets, conventional methods are not sufficiently capable to reconstruct every object in the scene, i.e., recover all the details in the image. For example, while for face datasets a human face is roughly the single object at the center, the image layout is much more diverse in datasets depicting, e.g., driving scenes as there are multiple objects such as cars in the image.

Advantageously, the method with features of the present invention allows for training an encoder, which is able to accurately analyze latent factors of an image. This has the additional advantage of the encoder being suitable for augmenting images with a high structural complexity, thereby determining accurate augmentations.

SUMMARY

In a first aspect, the present invention relates to a computer-implemented method for training an encoder, wherein the encoder is configured for determining a latent representation of an image. According to an example embodiment of the present invention, training the encoder comprises the steps of:

Determining a latent representation and a noise image by providing a training image to the encoder, wherein the encoder is configured for determining a latent representation and a noise image for a provided image;

Masking out parts of the noise image, thereby determining a masked noise image;

Determining a predicted image by providing the latent representation and the masked noise image to a generator of a generative adversarial network;

Training the encoder by adapting parameters of the encoder based on a loss value, wherein the loss value characterizes a difference between the predicted image and the training image.

The encoder can be understood as a machine learning system, which is configured for accepting an image as input and predicting the latent representation based on the pixel values of the image. Preferably, the encoder is or comprises a neural network. In the method, the encoder is provided a training image for predicted the latent representation. Determining the latent representation can be understood as a specific form of image analysis. The encoder is trained to analyze the image for specific latent factors that characterize the image, wherein the latent factors are comprised by the latent representation.

A latent factor comprised by the latent representation may also be referred to as "style" in the art. In other words, the latent representation may also be understood as characterizing at least one latent style of the image. Latent factors may, in general, be understood as appearances of an image. For example, one latent factor could be a brightness of a situation depicted in the image. Concrete values of this latent factor may then, for example, characterize an image depicting a daytime scene. Other values for this latent factor may characterize a nighttime scene depicted by the image.

According to an example embodiment of the present invention, the encoder is further configured for predicting a second component during training, namely a noise image. This may be understood as an image of preferably a same aspect ratio as the training image. The name noise image is chosen with respect to similar naming of similar entities in StyleGAN. In other words, the noise image should not be understood as a prediction of noise in the image. It is an entity that characterizes one part of an inversion of an image as provided by the generator (the other part being the latent representation). In other words, if the training image was generated by the generator, the encoder learns to determine the noise that was used as input to the generator for generating the training image. The noise image may, for example, comprise values between 0 and 1 characterizing a percentage value of how much a pixel in the training image is subject to noise. The noise image may be of the same size as the training image, in which case there exists a 1-to-1 correspondence between pixels in the noise image and pixels in the training image. However, it is also possible for the encoder to predict a noise image whose size is scaled down compared to the training image.

According to an example embodiment of the present invention, the encoder may be understood to be able to be configured to process images from different types of sensors. In this sense, an image may be understood as a sensor measurement obtained from a camera, a LIDAR sensor, a radar sensor, an ultrasonic sensor, or a thermal camera.

According to an example embodiment of the present invention, in the method, parts of the noise image are masked out. This can be understood as replacing pixels in the noise image with other values. For example, pixel values in noise image may be masked out by replacing them with randomly drawn pixel values, preferably from a Gaussian distribution. For selecting which pixels shall be masked out, the pixels in image can be randomly assigned into either being masked out or not masked out. Alternatively, it is also possible to determine, e.g., at random, a region, e.g., a rectangular region, of the image that shall be masked out. Such a rectangular region is sometimes also referred to as patch.

The latent representation and the masked noise image are provided to a generator, which is configured to determine images based on a latent representation and a noise image. The generator may be a neural network, especially one configured for accepting latent representations and noise images at different layers of the neural network. Preferably, the encoder may provide the latent representation to all inputs of the generator requiring a latent representation. Alternatively it is also possible to configure the encoder such that it predicts a plurality of different latent representations and provide the different latent representation to the inputs requiring latent representations. For the noise image, the encoder may preferably predict a single noise image. The generator may then be provided the noise image at all inputs requiring a noise image. Alternatively, the noise image may only be provided to a single input of the generator requiring a noise image and all other inputs requiring a noise image may be provided a copy of a single randomly drawn noise image or a plurality of differently drawn noise images.

Preferably, according to an example embodiment of the present invention, the generator is a generator configured according to the StyleGAN or a StyleGAN2 architecture. Such a generator will also be referred to as "generator of a StyleGAN or a StyleGAN2". In embodiments using a generator of a StyleGAN or StyleGAN2, the latent representation is preferably provided directly to a generator of the StyleGAN or StyleGAN2, i.e., skipping the use of a mapping network. As StyleGAN and StyleGAN2 may also be configured to accept different latent representations and/or noise images for different parts of the StyleGAN, the encoder may hence also be configured to determine a plurality of latent representations and/or noise images to serve as input to the StyleGAN or StyleGAN2. While StyleGAN or StlyeGAN2 are the preferred generative adversarial networks to use for obtaining a generator, other machine learning system are possible as well as long as they determine an image based on at least a latent representation and a noise image.

During training of the encoder, the parameters of the generator are preferably fixed, i.e., they are not adapted. However, it is generally possible to also update parameters of the generator as part of the method.

According to an example embodiment of the present invention, the generator determines the predicted image based on the latent representation and the masked noise image. Based on the difference between the training image and the predicted image, the encoder is then trained by adapting parameters of the encoder. This is achieved by determining a loss value and adapting the parameters based on the loss value. Preferably, this is achieved by determining a gradient of the parameters with respect to loss by means of the backpropagation algorithm and adapting the parameters according to the negative gradient. Alternatively, other optimization method may used as well, e.g., evolutionary optimization.

According to an example embodiment of the present invention, the method may also be understood as a method for inverting the generator, i.e., a method for GAN inversion. This way, the latent factors from the latent space determined while training the generator can be recovered by the encoder. The inventors found that masking parts of the noise image leads to an improved performance of the encoder in accurately determining latent factors for a provided image, i.e., the encoder is able to analyze an image better. This is especially true for images that depict a high structural complexity such as images from natural scenes or images comprising a plurality of potentially different objects.

The loss value may especially be determined based on a loss function, wherein a first term of the loss function characterizes the difference between the predicted image and the training image.

Preferably, according to an example embodiment of the present invention, the first term further characterizes a masking of the difference, wherein the masking removes pixel from the difference that fall into the masked-out parts.

The difference may, for example, be an averaged $L_2$-norm of corresponding pixels from the training image and the predicted image. The inventors found that it is beneficial for the performance of the encoder to not consider pixels in the difference that have been subject to being masked out.

Preferably, according to an example embodiment of the present invention, the loss function comprises a second term that characterizes a norm of the noise image predicted by the encoder.

This is advantageous as the second term discourages the encoder to learn to predict noise images with large variance thereby limiting the amount of information that is provided by the noise image. Thereby, the latent factors of the image are encoded in the latent representation more faithfully and not leaked over to the noise image.

Preferably, according to an example embodiment of the present invention, the loss function comprises a third term characterizing a negative log likelihood of an output signal of a discriminator, wherein the output signal is determined by the discriminator by providing the predicted image $(x^*_i)$ to the discriminator.

The inventors found that use of a discriminator further increases the accuracy of the encoder to determine an accurate latent representation for a provided image. Parameters of the discriminator are also preferably fixed during training of the encoder. By employing a decoder, the encoder is further encouraged to determine latent representations that characterize accurate values for the respective latent factors. As the generator and discriminator may be fixed, the encoder is preferably the only entity that may be adapted during training, i.e., the only entity that can change the predicted image. As the inventors found out, the term provides an advantageous incentive during optimization to have real-looking images be generated by the generator. In other words, the encoder is incentivized to determine latent representations that the generator maps to real-looking images.

Preferably, according to an example embodiment of the present invention, the training image may be determined by providing a randomly sampled latent representation or a user defined latent representation to the generator and wherein the loss function comprises a fourth term characterizing a difference between the randomly sampled or used defined latent representation and the latent representation determined from the encoder.

This can be understood as providing for a circular consistency when mapping back and forth between latent representation and predicted image. The starting point may hence be a latent representation chosen at random or at a user's discretion, wherein the latent representation is then provided to the generator for determining the training image. The training image is then provided to the encoder for determining the latent representation as predicted by the encoder. This latent representation should be close to the latent representation chosen before, i.e., mapping back and forth between latent representation and image should yield the same result. The fourth term advantageously incentivizes the encoder to ensure such cyclic consistency. The inventors found that the fourth term hence advantageously increases the accurate of the encoder even further.

In embodiments of the present invention comprising the fourth term, the noise image required for generating the predicted image from the generator may be sampled at random or may be a predefined noise image.

Preferably, according to an example embodiment of the present invention, the loss function comprises a fifth term characterizing a difference of a first feature representation determined by providing the training image to a feature extractor and a second feature representation determined by providing the predicted image to the feature extractor, wherein the difference does preferably not characterize features characterizing pixels in the masked-out parts.

This can be understood as adding a term to the loss function characterizing an LPIPS metric. The feature extractor can be understood as a machine learning system that is configured to determine features in the sense of machine learning from the supplied training image and predicted image respectively. For example, a feature extractor may be a neural network such as the convolutional part of a VGG-net. The inventors found that adding the fifth term further increases the accuracy of the encoder.

Any combination of the first term to fifth term in the loss function is possible. In other words, it is possible to train with some of the terms or leave some of the terms out.

In another aspect, the present invention relates to a computer-implemented method for determining an augmentation of an image comprising the steps of:

Obtained an encoder based on training the encoder with a method as described above;

Determining a first latent representation and a noise image by providing the image to the encoder;

Altering the first latent representation, thereby determining a second latent representation;

Determining the augmentation by providing the second latent representation and the noise image as input to the generator used in training the encoder.

Obtaining the encoder based on training may be understood as conducting the method for training as part of the method for determining the augmentation. Alternatively, it may also be understood as obtaining an already trained encoder, wherein the encoder was trained with the method for training as presented above.

In the method for determining the augmentation according to an example embodiment of the present invention, the augmentation is determined by extracting a latent representation and a noise image from the image using the encoder, altering latent factors in the latent representation, and determining the augmentation by providing the altered latent representation and the noise image to the generator used when training the encoder.

Advantageously, according to an example embodiment of the present invention, the method allows for creating images that can be used for training a machine learning system. Due to changing latent factors, the augmentation characterizes a different style of the image while preserving at least parts of its content. This way, when using the augmentation for training a machine learning system, the machine learning system is presented with a more diverse set of images as the augmentation characterizes a different style. The inventors found that this improves a performance of the machine learning system.

In another aspect, the present invention hence concerns a computer-implemented method for training a machine learning system, wherein the machine learning system is configured for determining an output signal characterizing a classification and/or regression analysis of an image. According to an example embodiment of the present invention, the method comprises the steps of:

Determining an augmentation of a training image according to the present invention;

Training the machine learning system based on the augmentation.

Example embodiments of the present invention will be discussed with reference to the figures in more detail.

DETAILED DESCRIPTION OF EXAMPLE EMBODIMENTS

Figure 1:
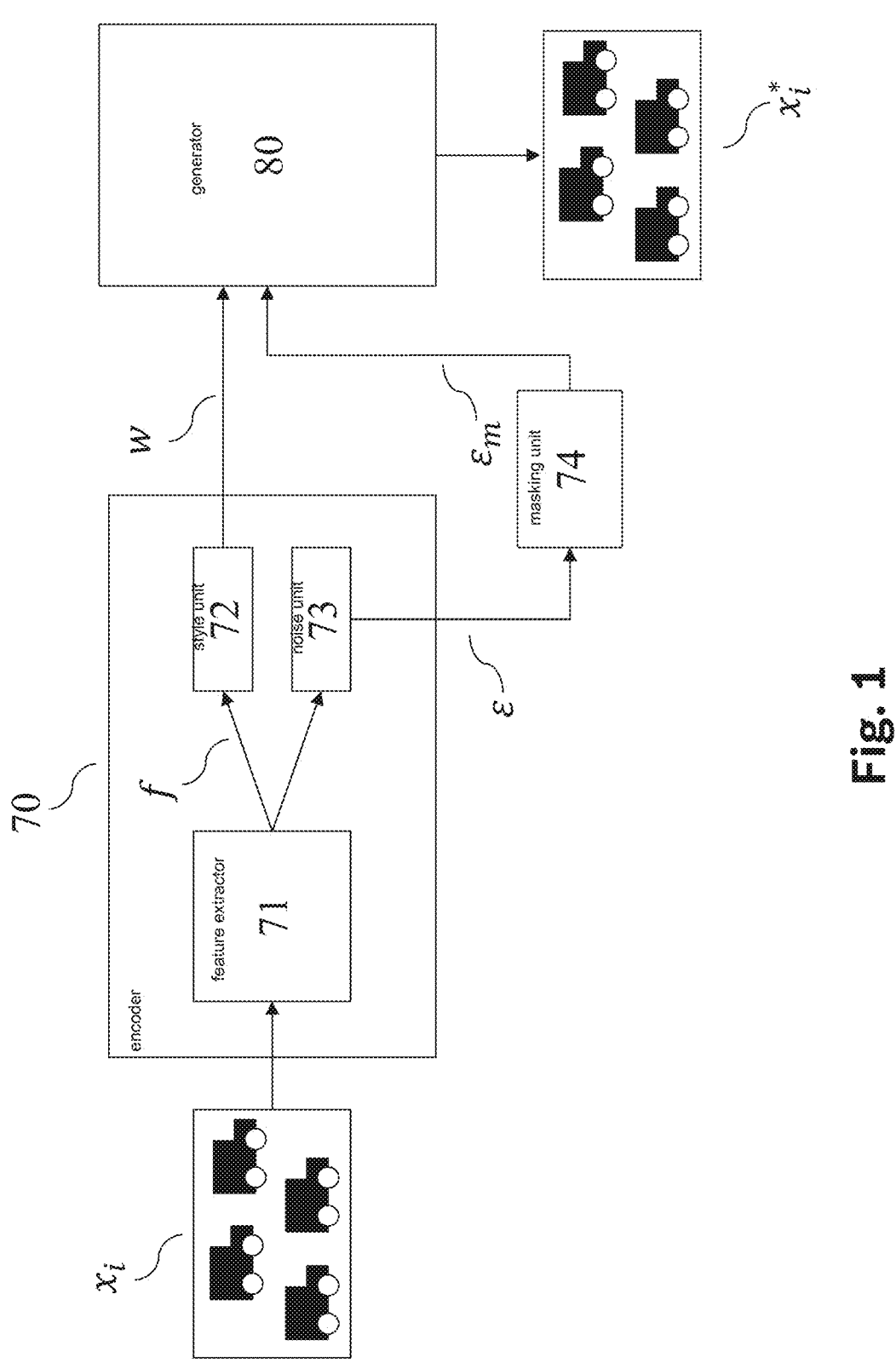
FIG. 1 shows schematically parts of a training method for training an encoder, according to an example embodiment of the present invention.

FIG. 1 shows parts of an embodiment of a method for training an encoder (70). During the method, the encoder (70) is trained to determine a latent representation (w) characterizing latent factors (also known as style) of an image and a noise image ($\varepsilon$), wherein the noise image ($\varepsilon$) can be understood as predicting areas of noise in the image.

The encoder (70) can be trained based on a single training image ($x_i$). Preferably, however, the method uses a plurality of training images ($x_i$) for training the encoder (70). The training image ($x_i$) or the plurality of training images ($x_i$) preferably depict a scene of high structural complexity, e.g., scenes of natural environment such as scenes encountered when driving a car and/or urban scenes.

In the embodiment, the encoder (70) is characterized by a neural network predicting the latent representation (w) and/or the noise image ($\varepsilon$). In other embodiments, other machine learning models may be used for predicting the latent representation (w) and/or the noise image ($\varepsilon$). The encoder (70) preferably comprises a feature extractor (71) for extracting features (f) from a training image ($x_i$) supplied to the encoder (70). The features (f) may preferably be forwarded to a style unit (72), wherein the style unit (72) is configured for determining the latent representation (w), and may be forwarded to a noise unit (73), wherein the noise unit (73) is configured for determining the noise image ($\varepsilon$). The style unit (72) and/or the noise unit (73) may preferably also be neural networks. In general, however, other machine learning models can be used for the style unit (72) and/or the noise unit (73) as well. In other embodiments, the encoder (70) may also comprise a single neural network for predicting the latent representation (w) and the noise image ($\varepsilon$).

In the embodiment, the latent representation (w) is configured to be a matrix or a tensor and the noise image ($\varepsilon$) is configured to be a matrix. The encoder (70) is configured such that a width and height dimension of the latent representation (w) and of the noise image ($\varepsilon$) have a same ratio as does the training image ($x_i$). This can preferably be achieved by employing aspect-preserving operations in the feature extractor (71), style unit (72), and noise unit (73), e.g., convolution operations with equal strides along the width and height.

The noise image ($\varepsilon$) is provided to a masking unit (74), which is configured for masking the noise image ($\varepsilon$). In the embodiment, masking is conducted by selecting elements of the noise image ($\varepsilon$) at random and replacing the respectively selected elements by randomly drawn values from a Gaussian distribution, thereby determining a masked noise image ($\varepsilon_m$). In further embodiments, the randomly drawn values may also be drawn from other probability distributions.

The latent representation (w) and the masked noise image ($\varepsilon_m$) are then provided as input to a generator (80) of a generative adversarial network. The generative adversarial network has preferably been trained before conducting the method for training the encoder (70). However, it is also possible to train the generative adversarial network as an additional step in training the encoder (70). The generative adversarial network is configured for determining images based on a provided latent representation and a noise image. Preferably, the generative adversarial network is a Style-GAN or a StyleGAN2.

The latent representation is preferably provided to the generator (80) without using a mapping network of Style-GAN or StyleGAN2. This is advantageous, as the encoder learns to determine latent representations form the intermediate latent space of StyleGAN or StyleGAN2. As this intermediate latent space has better disentanglement than the original latent space of StyleGAN or StyleGAN2, this advantageously further increases the performance of the encoder in determining latent factors for images.

The generator (80) determines a predicted image ($x^*_i$) based on the latent representation (w) and the noise image ($\varepsilon$). A loss value may then be determined, wherein the loss value characterizes a difference between the training image ($x_i$) and the predicted image ($x^*_i$). Training may then be executed to minimize the loss value. For example, the loss value may be determined based on a loss function. The loss function may especially characterize a first term characterizing the difference, i.e.:

$$\mathcal{L}_{rec} = \|(1-M) \odot (x_i - x^*_i)\|_2,$$

wherein $x_i$ and $x^*_i$ are the training image and predicted image respectively and $\odot$ is the Hadamard product. The term $1-M$ indicates a preferred weighting of pixels in the difference, namely that pixels, which have been masked out in the masked noise image ($\varepsilon_m$) are not considered when determining the first term $\mathcal{L}_{rec}$. The 1 is to be understood as a matrix of all ones of the same shape as the training image ($x_i$) and the predicted image ($x^*_i$), wherein the mask used for masking the noise image ($\varepsilon$) is scaled to the size of the training image ($x_i$) if the noise image ($\varepsilon$) has a different shape than the training image ($x_i$). Determining the $L_2$-norm for the difference $x_i - x^*_i$, is especially understood as taking an average of the Euclidean distance of corresponding pixels from $x_i$ and $x^*_i$.

Preferably, the loss function comprises a second term, wherein the second term characterizes a norm of the noise image ($\varepsilon$). Preferably, the is the sum of values in the noise image ($\varepsilon$) thereby encouraging sparsity when predicting the noise image. The second term can be expressed by the formula:

$$\mathcal{L}_{noise\_reg} = |\varepsilon|.$$

Preferably, the loss function comprises a third term characterizing a negative log likelihood of an output signal of a discriminator, wherein the output signal is determined by the discriminator by providing the predicted image ($x^*_i$) to the discriminator. In other words, the discriminator used when training the generative adversarial can be used as an additional guide when training the encoder (70). Through the decoder, the encoder gets additional information with respect to how "realistic" a predicted image ($x^*_i$) looks and thereby information about the usefulness of a latent representation for predicting "realistic" looking images. The third term may be expressed by the formula:

$$\mathcal{L}_{adv} = -\mathbb{E} \left[ \log(D(x^*_i)) \right],$$

wherein D is the discriminator and $\mathbb{E}$ is an expected value function.

Preferably, the loss function comprises a fourth term characterizing a difference between a randomly sampled or used defined latent representation and the latent representation determined from the encoder (70), wherein the randomly sampled or user defined latent representation is provided to the generator (80), thereby determining the training image ($x_i$). In other words, the training image ($x_i$) is determined based on the randomly sampled or user defined latent representation. The fourth term can be expressed by the formula:

$$\mathcal{L}_{w\_rec} = \|w - w_{gt}\|_2,$$

wherein $w_{gt}$ is the randomly sampled or used defined latent representation.

Preferably, the loss function comprises a fifth term characterizing a difference of a first feature representation determined by providing the training image ($x_i$) to a feature extractor and a second feature representation determined by providing the predicted image ($x^*_i$) to the feature extractor, wherein the difference does preferably not characterize features characterizing pixels in the masked-out parts. This may be understood as using an LPIPS metric as an additional guide when training the encoder (70). The fifth term can be expressed by the formula:

$$\mathcal{L}_{LPIPS} = \|(1-M) \odot (V(x_i) - V(x^*_i))\|_2,$$

wherein V is the feature extractor and the mask M is scaled to the width and height of the features, similar as is done for the first term $L\mathcal{L}_{rec}$.

Any combination of the terms may be used for determining the loss function $\mathcal{L}$. Preferably, the different terms are eight assigned a weight, wherein each weight controls the importance of the respective term with respect to the other terms. The loss function may hence be expressed by the formula:

$$\mathcal{L} = \alpha_1 \cdot \mathcal{L}_{rec} + \alpha_2 \cdot \mathcal{L}_{noise_{reg}} + \alpha_3 \cdot \mathcal{L}_{adv} + \alpha_4 \cdot \mathcal{L}_{w_{rec}} + \alpha_5 \cdot \mathcal{L}_{LPIPS},$$

wherein $\alpha_1$ to $\alpha_5$ are the weights of the respective terms. The weights may be understood as hyperparameters of the training method.

The encoder (70) may then be trained by means of gradient descent. This may especially be understood as adapting parameters according to a negative gradient of the loss with respect to the parameters.

Figure 2:
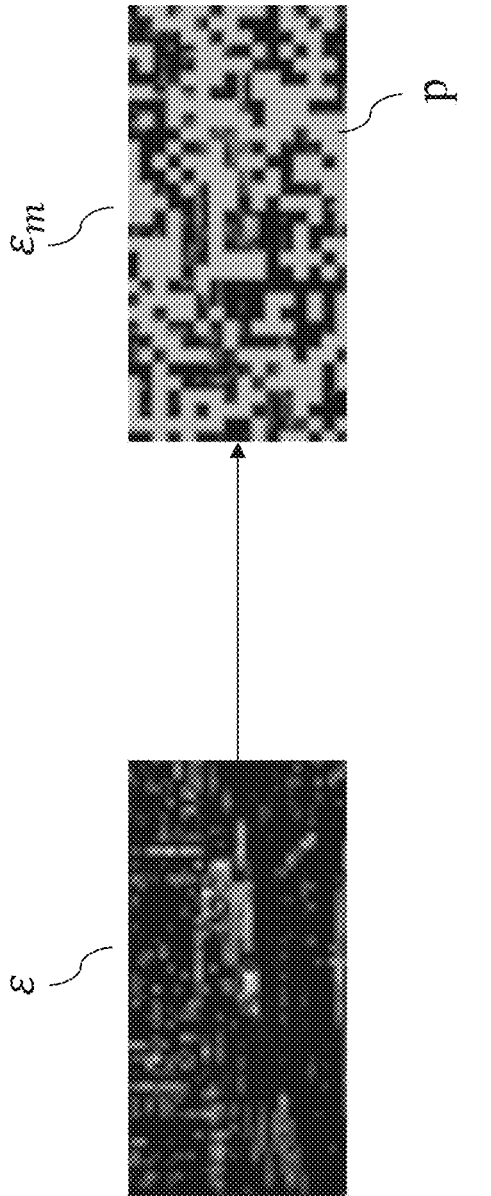
FIG. 2 shows schematically an example for masking a noise image according to an example embodiment of the present invention.

FIG. 2 shows how a noise image ($\varepsilon$) may be masked in order to determine the masked noise image ($\varepsilon_m$). The noise image ($\varepsilon$) is characterized by a matrix, whose elements are noise values. A plurality of elements are selected to be masked out. This plurality of elements are also referred to as masked-out parts (p) of the noise image ($\varepsilon$). They may be characterized by a binary matrix M comprising values of 1 for masked-out parts (p) and values of 0 for all other elements. The masked-out parts may then be replaced by randomly sampled values, e.g., values sampled from a Gaussian distribution.

Figure 3:
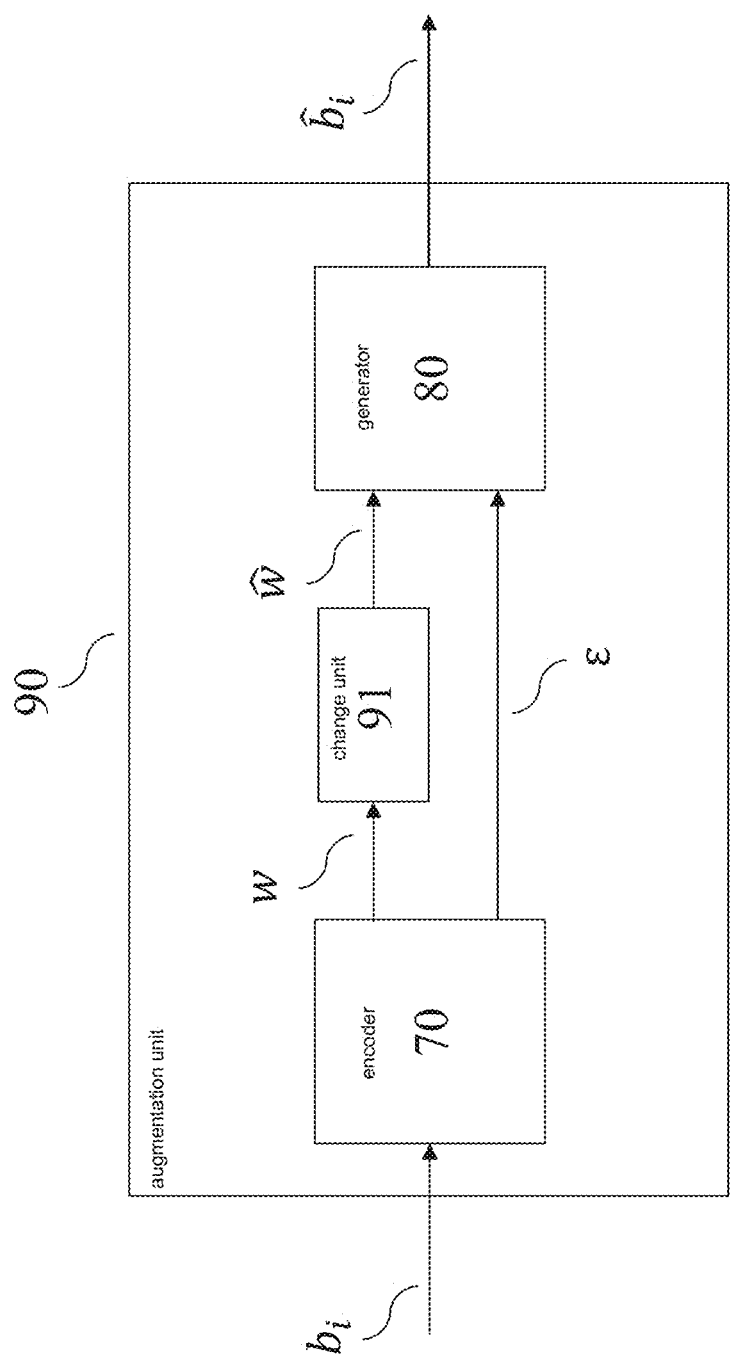
FIG. 3 shows an augmentation device for augmenting an image, according to an example embodiment of the present invention.

FIG. 3 shows an embodiment of an augmentation unit (90) configured for augmenting a provided image ($b_i$). The augmentation unit (90) comprises an encoder (70), which has been trained with the training method presented above. The encoder (70) receives the provided image ($b_i$) and determines a latent representation (w) as well as a noise image ($\varepsilon$). The latent representation (w) is provided to a change unit (91). The change unit (91) is configured to change one or multiple latent factors of the latent representation. Preferably, the change unit (91) determines one or multiple factors at random to change. The amount of change may also be chosen at random in an interval understood as hyperparameter of the change unit (91). By changing latent factors of the latent representation (w), the change unit (91) determines a second latent representation ($\hat{w}$). The second latent representation ($\hat{w}$) and the noise image ($\varepsilon$) are provided to the generator (80) that was used in training the encoder (70). The generator (80) then determines an image, which is provided as the augmentation ($b_i$).

Figure 4:
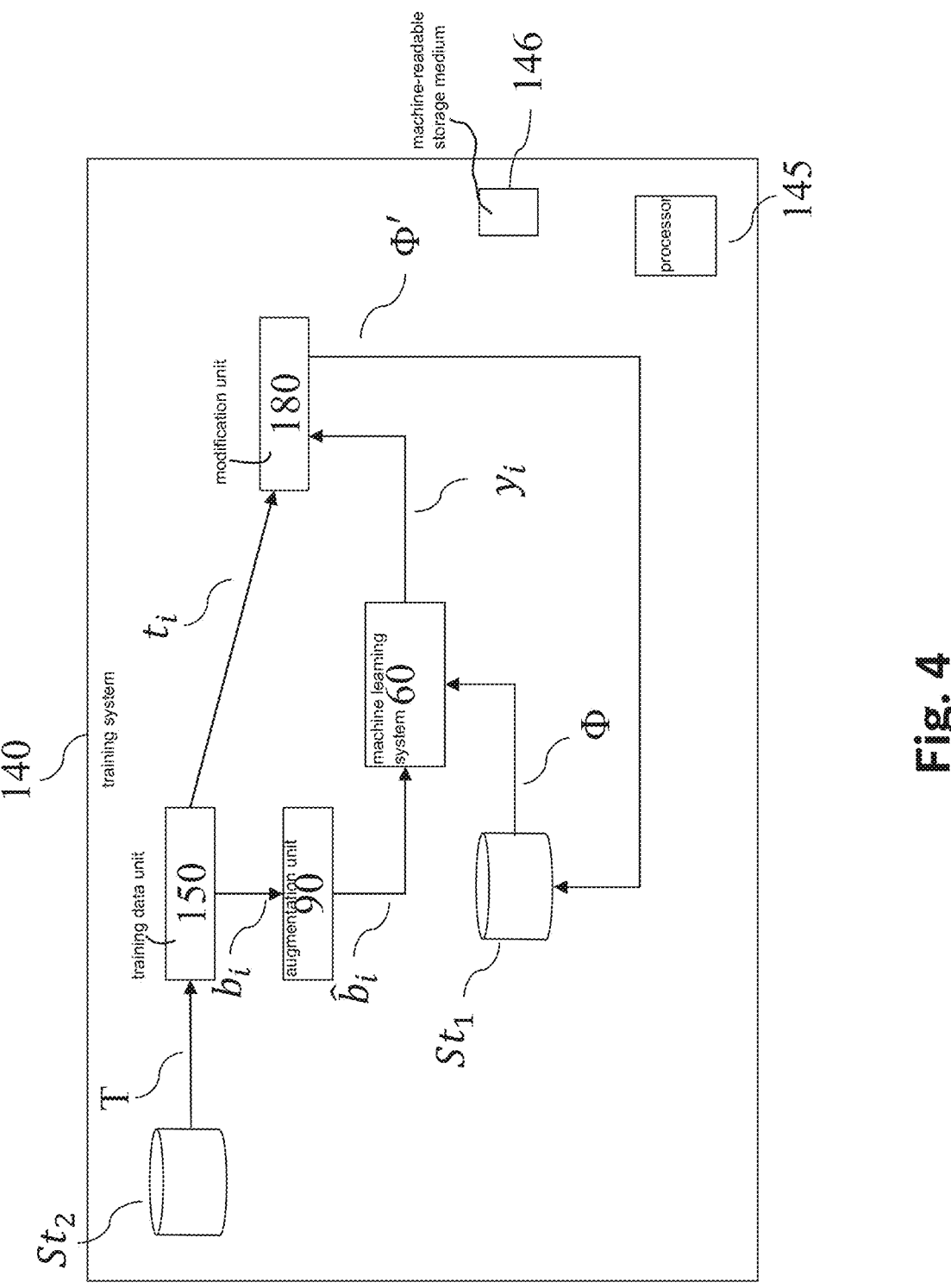
FIG. 4 shows a training system for training a machine learning system, according to an example embodiment of the present invention.

FIG. 4 shows an embodiment of a training system (140) using the augmentation unit (90) for training a machine learning system (60) by means of a training data set (T). The training data set (T) comprises a plurality of images ($b_i$) which are used for training the machine learning system (60), wherein the training data set (T) further comprises, for each image ($b_i$), a desired output signal ($t_i$) which corresponds to the image ($b_i$) and characterizes a desired classification and/or desired regression analysis result of the image ($b_i$).

For training, a training data unit (150) accesses a computer-implemented database ($St_2$), the database ($St_2$) providing the training data set (T). The training data unit (150) determines from the training data set (T) preferably randomly at least one image ($b_i$) and the desired output signal ($t_i$) corresponding to the image ($b_i$) and transmits the image ($b_i$) to the machine learning system (60). The machine learning system (60) determines an output signal ($y_i$) based on the image ($b_i$).

The desired output signal ($t_i$) and the determined output signal ($y_i$) are transmitted to a modification unit (180).

Based on the desired output signal ($t_i$) and the determined output signal ($y_i$), the modification unit (180) then determines new parameters ($\Phi'$) for the machine learning system (60). For this purpose, the modification unit (180) compares the desired output signal ($t_i$) and the determined output signal ($y_i$) using a loss function. The loss function determines a first loss value that characterizes how far the determined output signal ($y_i$) deviates from the desired output signal ($t_i$). In the given embodiment, a negative log-likelihood function is used as the loss function. Other loss functions are also possible in alternative embodiments.

Furthermore, it is possible that the determined output signal ($y_i$) and the desired output signal ($t_i$) each comprise a plurality of sub-signals, for example in the form of tensors, wherein a sub-signal of the desired output signal ($t_i$) corresponds to a sub-signal of the determined output signal ($y_i$). It is possible, for example, that the machine learning system (60) is configured for object detection and a first sub-signal characterizes a probability of occurrence of an object with respect to a part of the image ($b_i$) and a second sub-signal characterizes the exact position of the object. If the determined output signal ($y_i$) and the desired output signal ($t_i$) comprise a plurality of corresponding sub-signals, a second loss value is preferably determined for each corresponding sub-signal by means of a suitable loss function and the determined second loss values are suitably combined to form the first loss value, for example by means of a weighted sum.

The modification unit (180) determines the new parameters ($\Phi'$) based on the first loss value. In the given embodiment, this is done using a gradient descent method, preferably stochastic gradient descent, Adam, or AdamW. In further embodiments, training may also be based on an evolutionary algorithm or a second-order method for training neural networks.

In other preferred embodiments, the described training is repeated iteratively for a predefined number of iteration steps or repeated iteratively until the first loss value falls below a predefined threshold value. Alternatively or additionally, it is also possible that the training is terminated when an average first loss value with respect to a test or validation data set falls below a predefined threshold value. In at least one of the iterations the new parameters ($\Phi'$) determined in a previous iteration are used as parameters ($\Phi$) of the machine learning system (60).

Furthermore, the training system (140) may comprise at least one processor (145) and at least one machine-readable storage medium (146) containing instructions which, when executed by the processor (145), cause the training system (140) to execute a training method according to one of the aspects of the present invention.

Figure 5:
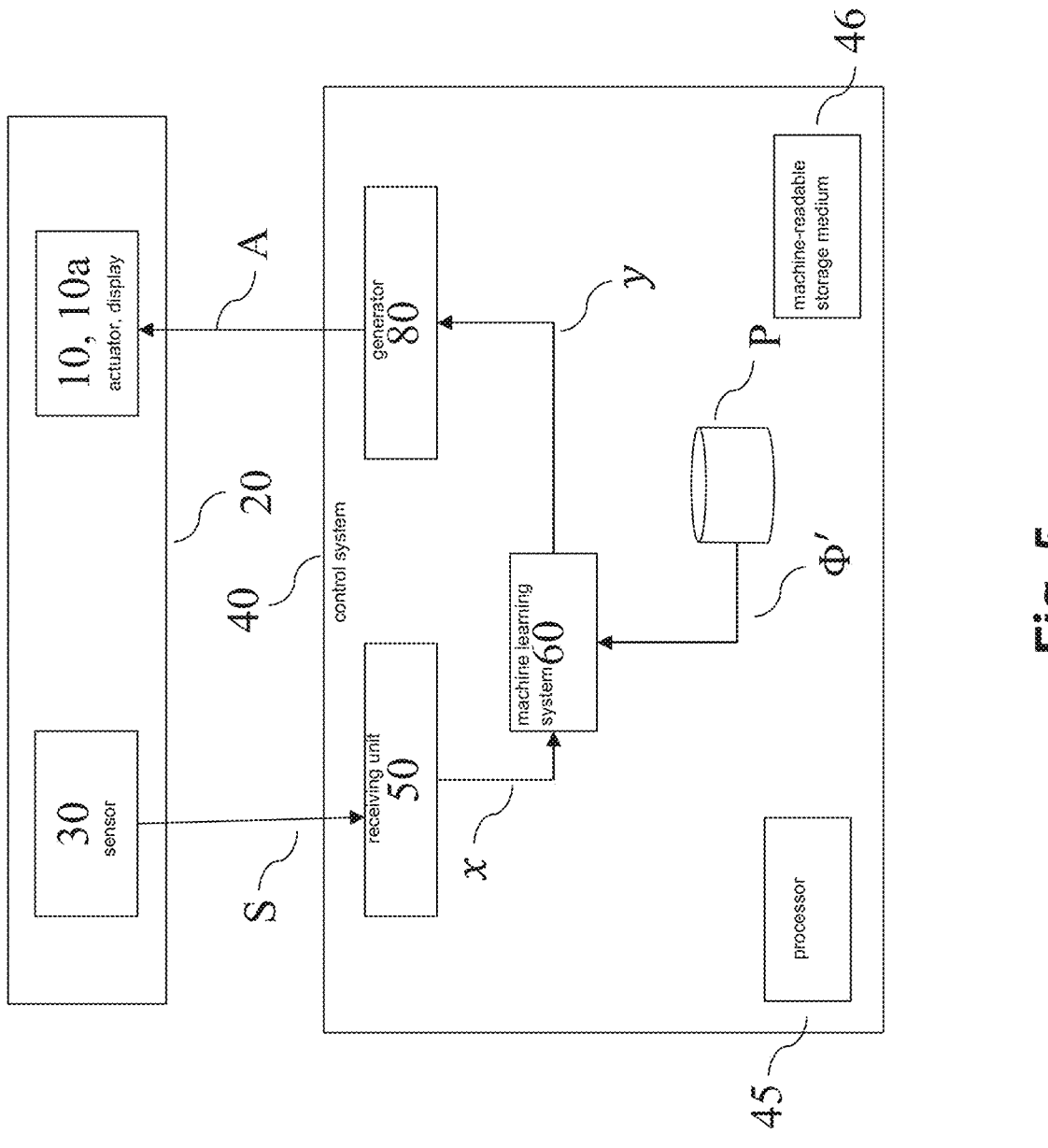
FIG. 5 shows a control system comprising the machine learning system for controlling an actuator in its environment, according to an example embodiment of the present invention.

FIG. 5 shows an embodiment of an actuator (10) in its environment (20). The actuator (10) interacts with a control system (40), wherein the control system (40) uses the machine learning system (60) for controlling the actuator (10). The actuator (10) and its environment (20) will be jointly called actuator system. At preferably evenly spaced points in time, a sensor (30) senses a condition of the actuator system. The sensor (30) may comprise several sensors. Preferably, the sensor (30) is an optical sensor that takes images of the environment (20). An output signal (S) of the sensor (30) (or, in case the sensor (30) comprises a plurality of sensors, an output signal (S) for each of the sensors) which encodes the sensed condition is transmitted to the control system (40).

Thereby, the control system (40) receives a stream of sensor signals (S). It then computes a series of control signals (A) depending on the stream of sensor signals (S), which are then transmitted to the actuator (10).

The control system (40) receives the stream of sensor signals (S) of the sensor (30) in an optional receiving unit (50). The receiving unit (50) transforms the sensor signals (S) into images (x). Alternatively, in case of no receiving unit (50), each sensor signal (S) may directly be taken as a image (x). The image (x) may, for example, be given as an excerpt from the sensor signal (S). Alternatively, the sensor signal (S) may be processed to yield the image (x). In other words, the image (x) is provided in accordance with the sensor signal (S).

The image (x) is then passed on to the machine learning system (60).

The machine learning system (60) is parametrized by parameters ($\Phi$), which are stored in and provided by a parameter storage ($St_1$).

The machine learning system (60) determines an output signal (y) from the images (x). The output signal (y) comprises information that assigns one or more labels to the image (x). The output signal (y) is transmitted to an optional conversion unit (80), which converts the output signal (y) into the control signals (A). The control signals (A) are then transmitted to the actuator (10) for controlling the actuator (10) accordingly. Alternatively, the output signal (y) may directly be taken as control signal (A).

The actuator (10) receives control signals (A), is controlled accordingly and carries out an action corresponding to the control signal (A). The actuator (10) may comprise a control logic which transforms the control signal (A) into a further control signal, which is then used to control actuator (10).

In further embodiments, the control system (40) may comprise the sensor (30). In even further embodiments, the control system (40) alternatively or additionally may comprise an actuator (10).

In still further embodiments, it can be envisioned that the control system (40) controls a display (10a) instead of or in addition to the actuator (10).

Furthermore, the control system (40) may comprise at least one processor (45) and at least one machine-readable storage medium (46) on which instructions are stored which, if carried out, cause the control system (40) to carry out a method according to an aspect of the present invention.

Figure 6:
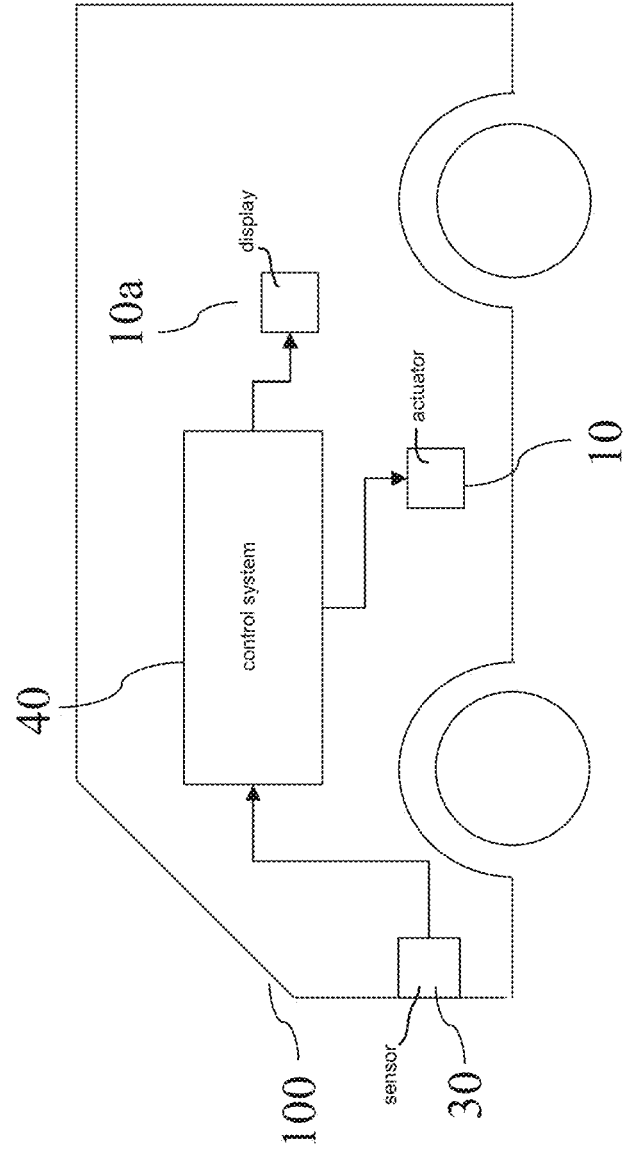
FIG. 6 shows the control system controlling an at least partially autonomous robot, according to an example embodiment of the present invention.

FIG. 6 shows an embodiment in which the control system (40) is used to control an at least partially autonomous robot, e.g., an at least partially autonomous vehicle (100).

The sensor (30) may comprise one or more video sensors and/or one or more radar sensors and/or one or more ultrasonic sensors and/or one or more LiDAR sensors. Some or all of these sensors are preferably but not necessarily integrated in the vehicle (100).

The machine learning system (60) may be configured to detect objects in the vicinity of the at least partially autonomous robot based on the image (x). The output signal (y) may comprise an information, which characterizes where objects are located in the vicinity of the at least partially autonomous robot. The control signal (A) may then be determined in accordance with this information, for example to avoid collisions with the detected objects.

The actuator (10), which is preferably integrated in the vehicle (100), may be given by a brake, a propulsion system, an engine, a drivetrain, or a steering of the vehicle (100). The control signal (A) may be determined such that the actuator (10) is controlled such that vehicle (100) avoids collisions with the detected objects. The detected objects may also be classified according to what the machine learning system (60) deems them most likely to be, e.g., pedestrians or trees, and the control signal (A) may be determined depending on the classification.

Alternatively or additionally, the control signal (A) may also be used to control the display (10a), e.g., for displaying the objects detected by the machine learning system (60). It can also be imagined that the control signal (A) may control the display (10a) such that it produces a warning signal if the vehicle (100) is close to colliding with at least one of the detected objects. The warning signal may be a warning sound and/or a haptic signal, e.g., a vibration of a steering wheel of the vehicle.

In further embodiments, the at least partially autonomous robot may be given by another mobile robot (not shown), which may, for example, move by flying, swimming, diving or stepping. The mobile robot may, inter alia, be an at least partially autonomous lawn mower, or an at least partially autonomous cleaning robot. In all of the above embodiments, the control signal (A) may be determined such that propulsion unit and/or steering and/or brake of the mobile robot are controlled such that the mobile robot may avoid collisions with said identified objects.

In a further embodiment, the at least partially autonomous robot may be given by a gardening robot (not shown), which uses the sensor (30), preferably an optical sensor, to determine a state of plants in the environment (20). The actuator (10) may control a nozzle for spraying liquids and/or a cutting device, e.g., a blade. Depending on an identified species and/or an identified state of the plants, an control signal (A) may be determined to cause the actuator (10) to spray the plants with a suitable quantity of suitable liquids and/or cut the plants.

In even further embodiments, the at least partially autonomous robot may be given by a domestic appliance (not shown), like e.g. a washing machine, a stove, an oven, a microwave, or a dishwasher. The sensor (30), e.g., an optical sensor, may detect a state of an object which is to undergo processing by the household appliance. For example, in the case of the domestic appliance being a washing machine, the sensor (30) may detect a state of the laundry inside the washing machine. The control signal (A) may then be determined depending on a detected material of the laundry.

Figure 7:
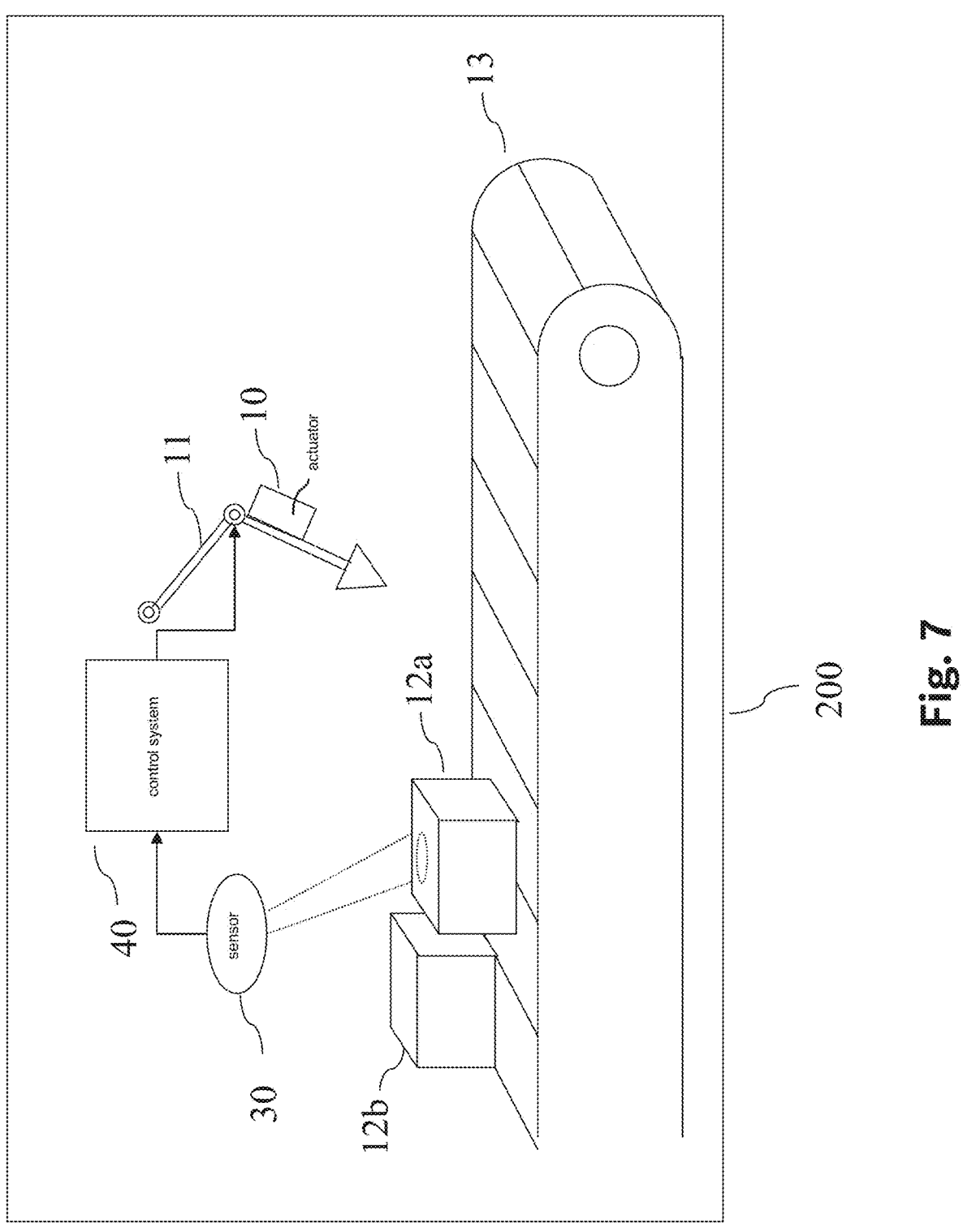
FIG. 7 shows the control system controlling a manufacturing machine, according to an example embodiment of the present invention.

FIG. 7 shows an embodiment in which the control system (40) is used to control a manufacturing machine (11), e.g., a punch cutter, a cutter, a gun drill or a gripper, of a manufacturing system (200), e.g., as part of a production line. The manufacturing machine may comprise a transportation device, e.g., a conveyer belt or an assembly line, which moves a manufactured product (12). The control system (40) controls an actuator (10), which in turn controls the manufacturing machine (11).

The sensor (30) may be given by an optical sensor which captures properties of, e.g., a manufactured product (12). The machine learning system (60) may hence be understood as an image classifier.

The machine learning system (60) may determine a position of the manufactured product (12) with respect to the transportation device. The actuator (10) may then be controlled depending on the determined position of the manufactured product (12) for a subsequent manufacturing step of the manufactured product (12). For example, the actuator (10) may be controlled to cut the manufactured product at a specific location of the manufactured product itself. Alternatively, it may be envisioned that the machine learning system (60) classifies, whether the manufactured product is broken and/or exhibits a defect. The actuator (10) may then be controlled as to remove the manufactured product from the transportation device.

Figure 8:
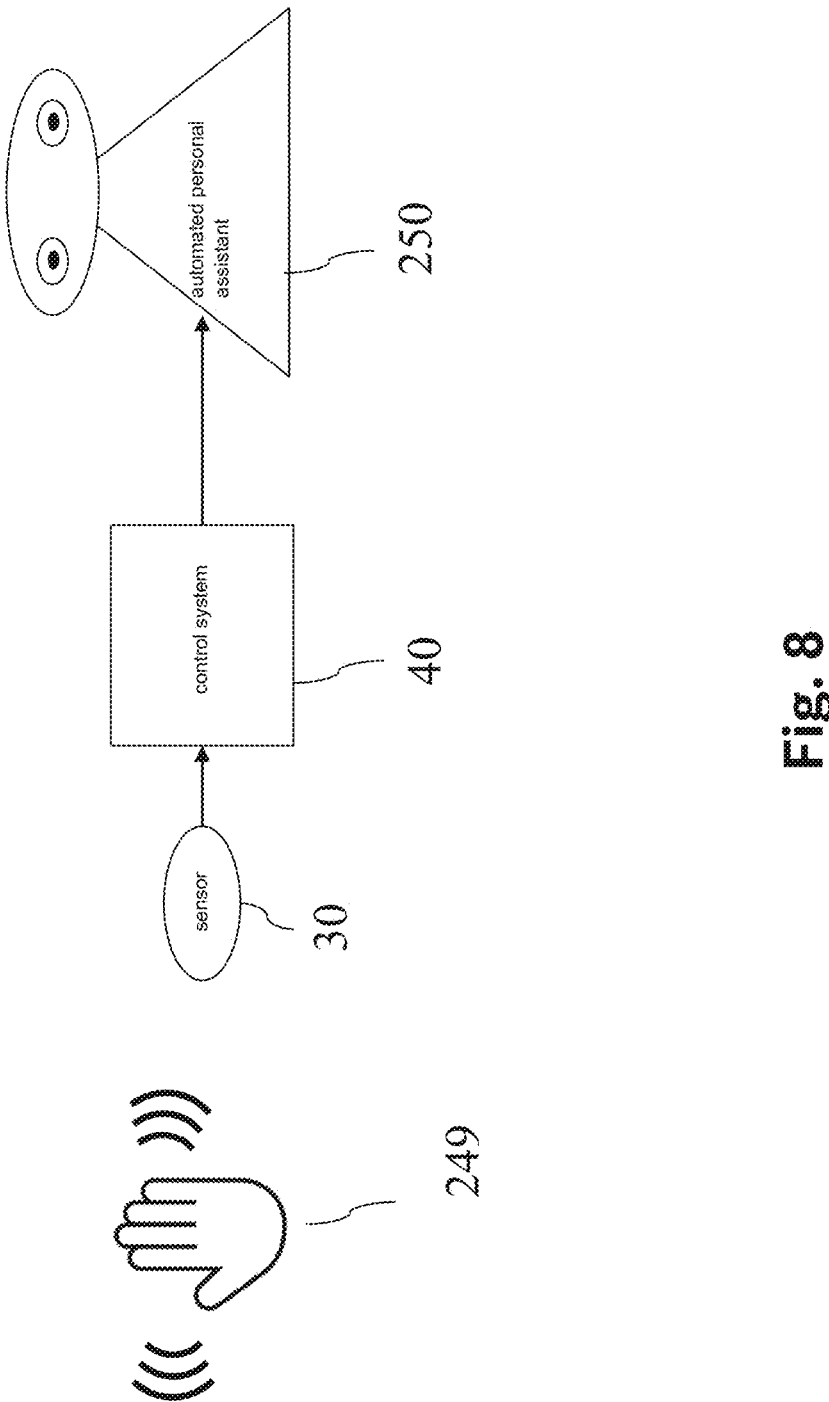
FIG. 8 shows the control system controlling an automated personal assistant, according to an example embodiment of the present invention.

FIG. 8 shows an embodiment in which the control system (40) is used for controlling an automated personal assistant (250). The sensor (30) may be an optic sensor, e.g., for receiving video images of a gestures of a user (249). Alternatively, the sensor (30) may also be an audio sensor, e.g., for receiving a voice command of the user (249).

The control system (40) then determines control signals (A) for controlling the automated personal assistant (250). The control signals (A) are determined in accordance with the sensor signal (S) of the sensor (30). The sensor signal (S) is transmitted to the control system (40). For example, the machine learning system (60) may be configured to, e.g., carry out a gesture recognition algorithm to identify a gesture made by the user (249). The control system (40) may then determine a control signal (A) for transmission to the automated personal assistant (250). It then transmits the control signal (A) to the automated personal assistant (250).

For example, the control signal (A) may be determined in accordance with the identified user gesture recognized by the machine learning system (60). It may comprise information that causes the automated personal assistant (250) to retrieve information from a database and output this retrieved information in a form suitable for reception by the user (249).

In further embodiments, it may be envisioned that instead of the automated personal assistant (250), the control system (40) controls a domestic appliance (not shown) controlled in accordance with the identified user gesture. The domestic appliance may be a washing machine, a stove, an oven, a microwave or a dishwasher.

Figure 9:
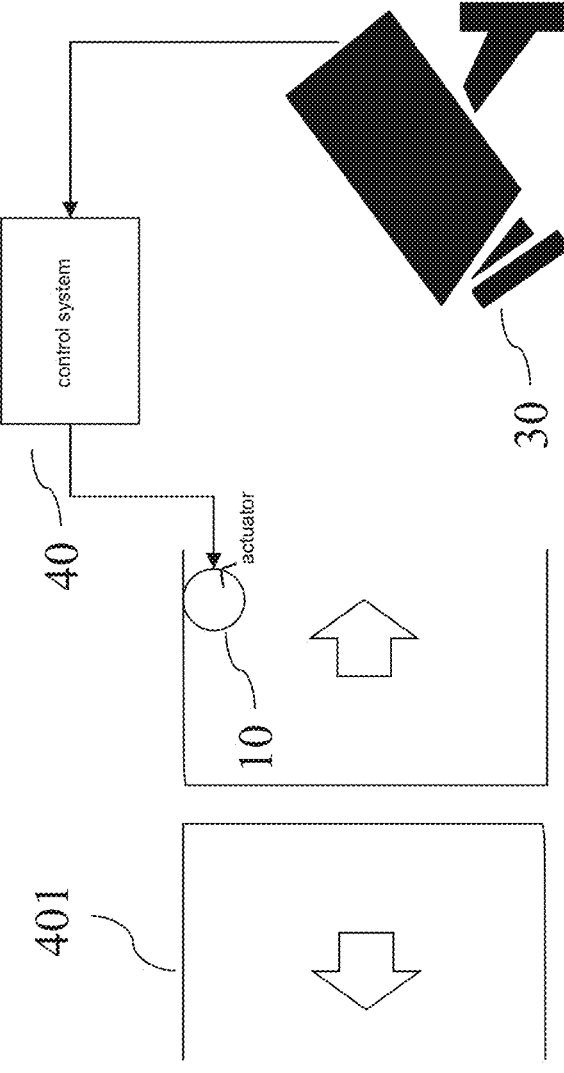
FIG. 9 shows the control system controlling an access control system, according to an example embodiment of the present invention.
Figure 9:

FIG. 9 shows an embodiment in which the control system (40) controls an access control system (300). The access control system (300) may be designed to physically control access. It may, for example, comprise a door (401). The sensor (30) can be configured to detect a scene that is relevant for deciding whether access is to be granted or not. It may, for example, be an optical sensor for providing image or video data, e.g., for detecting a person's face. The machine learning system (60) may hence be understood as an image classifier.

The machine learning system (60) may be configured to classify an identity of the person, e.g., by matching the detected face of the person with other faces of known persons stored in a database, thereby determining an identity of the person. The control signal (A) may then be determined depending on the classification of the machine learning system (60), e.g., in accordance with the determined identity. The actuator (10) may be a lock which opens or closes the door depending on the control signal (A). Alternatively, the access control system (300) may be a non-physical, logical access control system. In this case, the control signal may be used to control the display (10a) to show information about the person's identity and/or whether the person is to be given access.

Figure 10:
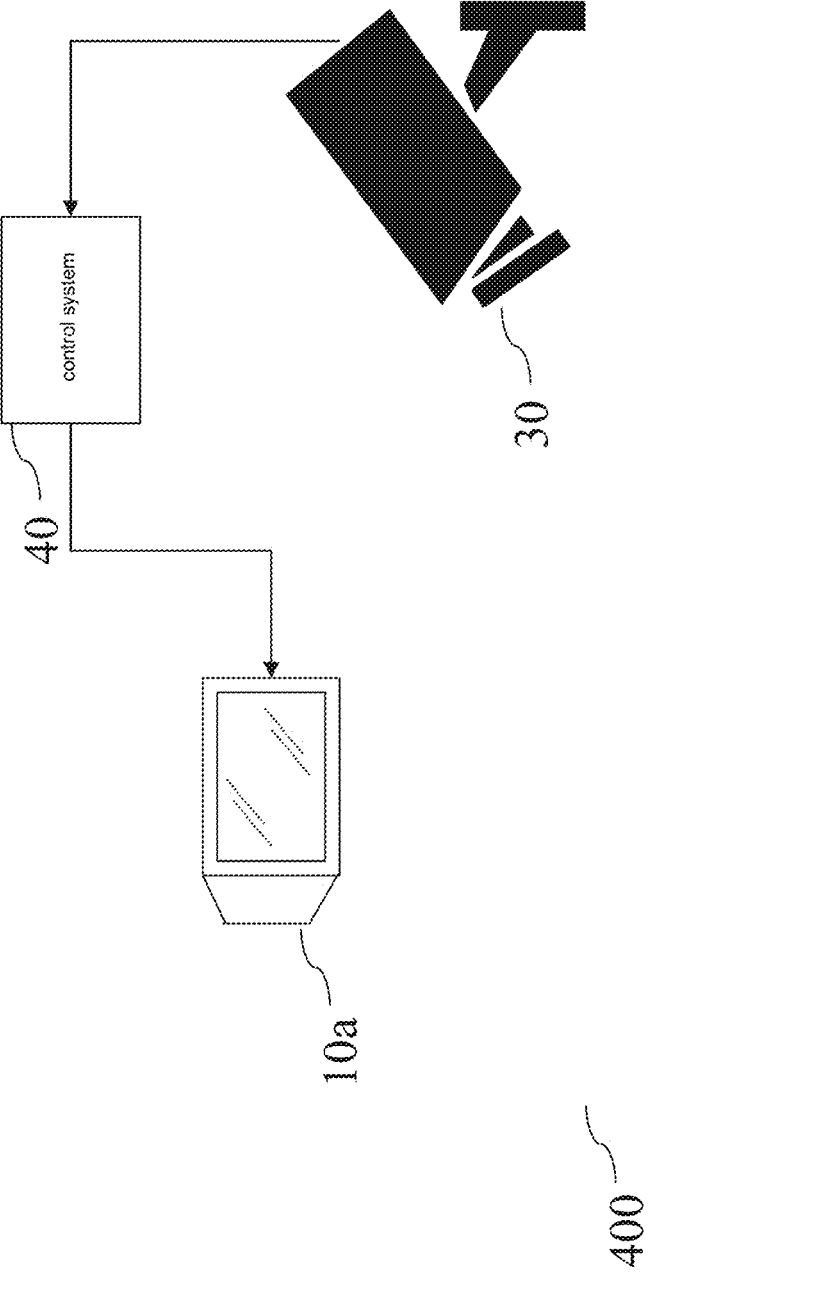
FIG. 10 shows the control system controlling a surveillance system, according to an example embodiment of the present invention.

FIG. 10 shows an embodiment in which the control system (40) controls a surveillance system (400). This embodiment is largely identical to the embodiment shown in FIG. 9. Therefore, only the differing aspects will be described in detail. The sensor (30) is configured to detect a scene that is under surveillance. The control system (40) does not necessarily control an actuator (10), but may alternatively control a display (10a). For example, the machine learning system (60) may determine a classification of a scene, e.g., whether the scene detected by an optical sensor (30) is normal or whether the scene exhibits an anomaly. The control signal (A), which is transmitted to the display (10a), may then, for example, be configured to cause the display (10a) to adjust the displayed content dependent on the determined classification, e.g., to highlight an object that is deemed anomalous by the machine learning system (60).

Figure 11:
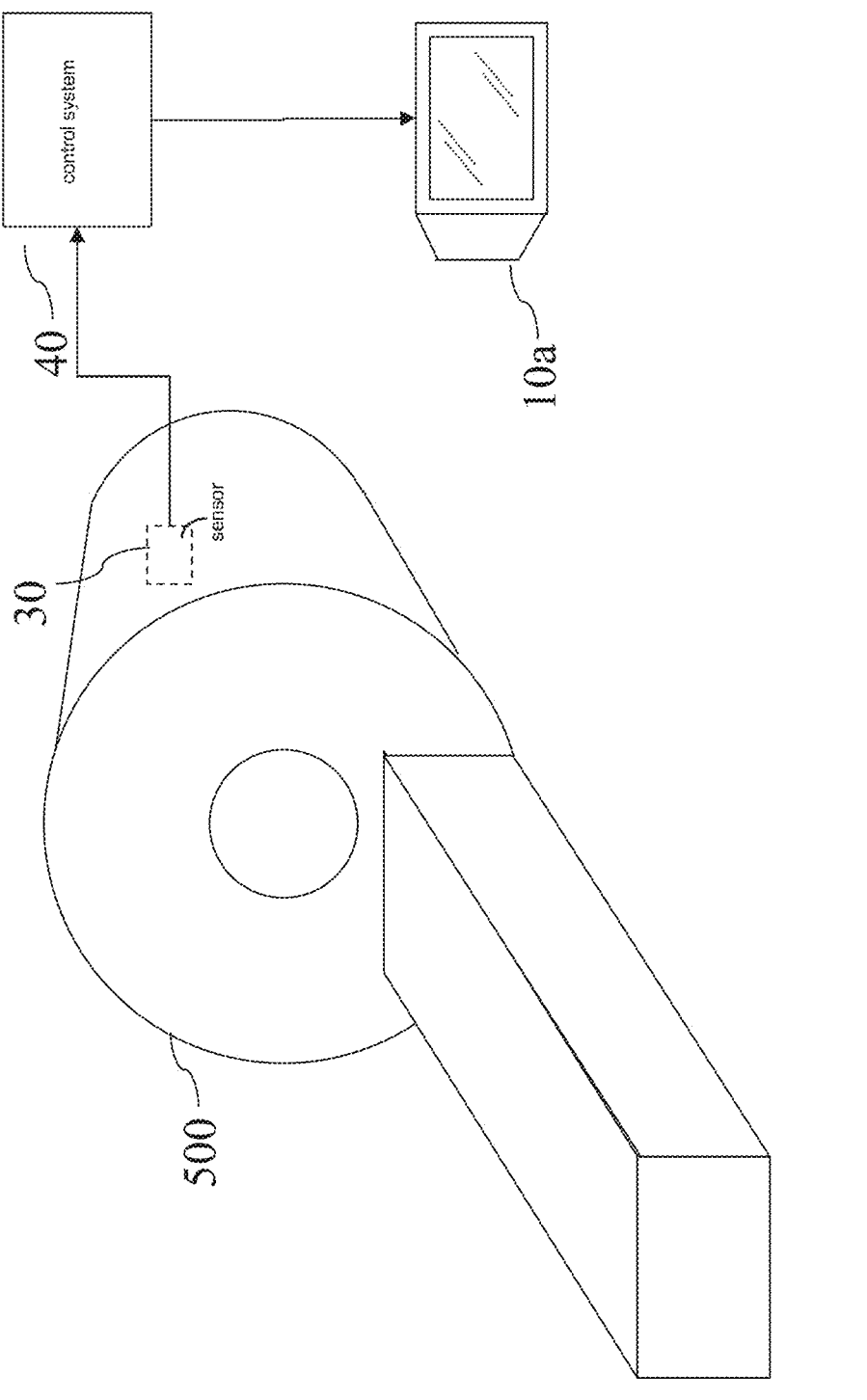
FIG. 11 shows the control system controlling an imaging system, according to an example embodiment of the present invention.

FIG. 11 shows an embodiment of a medical imaging system (500) controlled by the control system (40). The imaging system may, for example, be an MRI apparatus, x-ray imaging apparatus or ultrasonic imaging apparatus. The sensor (30) may, for example, be an imaging sensor which takes at least one image of a patient, e.g., displaying different types of body tissue of the patient.

The machine learning system (60) may then determine a classification of at least a part of the sensed image. The at least part of the image is hence used as input image (x) to the machine learning system (60).

The control signal (A) may then be chosen in accordance with the classification, thereby controlling a display (10a). For example, the machine learning system (60) may be configured to detect different types of tissue in the sensed image, e.g., by classifying the tissue displayed in the image into either malignant or benign tissue. This may be done by means of a semantic segmentation of the input image (x) by the machine learning system (60). The control signal (A) may then be determined to cause the display (10a) to display different tissues, e.g., by displaying the input image (x) and coloring different regions of identical tissue types in a same color.

In further embodiments (not shown) the imaging system (500) may be used for non-medical purposes, e.g., to determine material properties of a workpiece. In these embodiments, the machine learning system (60) may be configured to receive an input image (x) of at least a part of the workpiece and perform a semantic segmentation of the input image (x), thereby classifying the material properties of the workpiece. The control signal (A) may then be determined to cause the display (10a) to display the input image (x) as well as information about the detected material properties.

Figure 12:
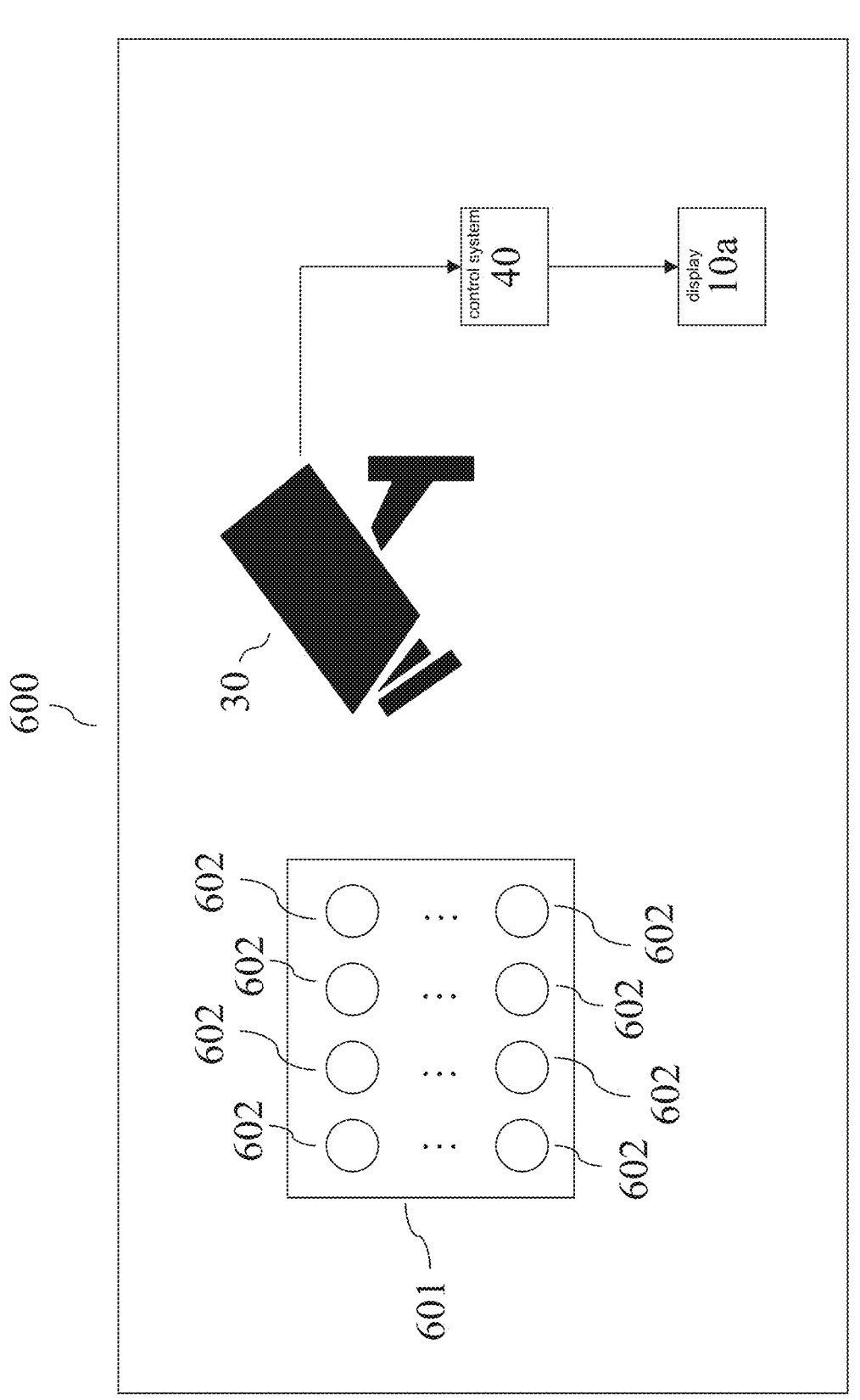
FIG. 12 shows the control system controlling a medical analysis system, according to an example embodiment of the present invention.

FIG. 12 shows an embodiment of a medical analysis system (600) being controlled by the control system (40). The medical analysis system (600) is supplied with a microarray (601), wherein the microarray comprises a plurality of spots (602, also known as features) which have been exposed to a medical specimen. The medical specimen may, for example, be a human specimen or an animal specimen, e.g., obtained from a swab.

The microarray (601) may be a DNA microarray or a protein microarray.

The sensor (30) is configured to sense the microarray (601). The sensor (30) is preferably an optical sensor such as a video sensor.

The machine learning system (60) is configured to classify a result of the specimen based on an input image (x) of the microarray supplied by the sensor (30). In particular, the machine learning system (60) may be configured to determine whether the microarray (601) indicates the presence of a virus in the specimen.

The control signal (A) may then be chosen such that the display (10a) shows the result of the classification.

The term "computer" may be understood as covering any devices for the processing of pre-defined calculation rules. These calculation rules can be in the form of software, hardware or a mixture of software and hardware.

In general, a plurality can be understood to be indexed, that is, each element of the plurality is assigned a unique index, preferably by assigning consecutive integers to the elements contained in the plurality. Preferably, if a plurality comprises N elements, wherein N is the number of elements in the plurality, the elements are assigned the integers from 1 to N. It may also be understood that elements of the plurality can be accessed by their index.

What is claimed is:

1. A computer-implemented method for training an encoder, wherein the encoder is configured for determining a latent representation of an image, and the training of the encoder comprises the following steps of:
   determining a latent representation and a noise image by providing a training image to the encoder, wherein the encoder is configured for determining a latent representation and a noise image for a provided image;
   masking out parts of the noise image to determine a masked noise image;
   determining a predicted image by providing the latent representation and the masked noise image to a generator of a generative adversarial network; and
   training the encoder by adapting parameters of the encoder based on a loss value, wherein the loss value characterizes a difference between the predicted image and the training image.

2. The method according to claim 1, wherein the masking out of parts of the noise image includes replacing values within the parts with randomly drawn values.

3. The method according to claim 1, wherein the loss value is determined based on a loss function, wherein a first term of the loss function characterizes the difference between the predicted image and the training image.

4. The method according to claim 3, wherein the first term further characterizes a masking of the difference, wherein the masking removes pixels from the difference that fall into the masked-out parts.

5. The method according to claim 3, wherein the loss function includes a second term that characterizes a norm of the noise image predicted by the encoder.

6. The method according to claim 5, wherein the loss function includes a third term characterizing a negative log likelihood of an output signal of a discriminator, wherein the output signal is determined by the discriminator by providing the predicted image to the discriminator.

7. The method according to claim 6, wherein the training image is determined by providing a randomly sampled latent representation or a user defined latent representation to the generator and wherein the loss function includes a fourth term characterizing a difference between the randomly sampled or user defined latent representation and the latent representation determined from the encoder.

8. The method according to claim 3, wherein the loss function includes a fifth term characterizing a difference of a first feature representation determined by providing the training image to a feature extractor and a second feature representation determined by providing the predicted image to the feature extractor, wherein the difference does not characterize features characterizing pixels in the masked-out parts.

9. A computer-implemented method for determining an augmentation of an image, comprising the following steps:
   obtaining a trained encoder, the encoder being configured for determining a latent representation of an image, the encoder being trained by:
      determining a latent representation and a noise image by providing a training image to the encoder, wherein the encoder is configured for determining a latent representation and a noise image for a provided image,
      masking out parts of the noise image to determine a masked noise image,
      determining a predicted image by providing the latent representation and the masked noise image to a generator of a generative adversarial network, and
      training the encoder by adapting parameters of the encoder based on a loss value, wherein the loss value characterizes a difference between the predicted image and the training image;
   determining a first latent representation and a noise image by providing the image to the trained encoder;
   altering the first latent representation to determine a second latent representation; and
   determining the augmentation by providing the second latent representation and the noise image used in the training the encoder, as input to the generator.

10. A computer-implemented method for training a machine learning system, wherein the machine learning system is configured for determining an output signal characterizing a classification and/or regression analysis of an image, wherein the method comprises the following steps:
   determining an augmentation of a second training image by:
      obtaining a trained encoder, the encoder being configured for determining a latent representation of an image, the encoder being trained by:
         determining a latent representation and a noise image by providing a training image to the encoder, wherein the encoder is configured for determining a latent representation and a noise image for a provided image, masking out parts of the noise image to determine a masked noise image, determining a predicted image by providing the latent representation and the masked noise image to a generator of a generative adversarial network, and training the encoder by adapting parameters of the encoder based on a loss value, wherein the loss value characterizes a difference between the predicted image and the training image;

determining a first latent representation and a noise image by providing the second training image to the trained encoder;

altering the first latent representation to determine a second latent representation;

determining the augmentation by providing the second latent representation and the noise image used in the training the encoder, as input to the generator; and training the machine learning system based on the augmentation.

11. A computer-implemented method for determining a control signal of an actuator using a machine learning system, wherein the machine learning system is configured for determining an output signal characterizing a classification and/or regression analysis of an image, wherein the method comprises the following steps:

determining an augmentation of a second training image by:

obtaining a trained encoder, the encoder being configured for determining a latent representation of an image, the encoder being trained by:

determining a latent representation and a noise image by providing a training image to the encoder, wherein the encoder is configured for determining a latent representation and a noise image for a provided image, masking out parts of the noise image to determine a masked noise image, determining a predicted image by providing the latent representation and the masked noise image to a generator of a generative adversarial network, and training the encoder by adapting parameters of the encoder based on a loss value, wherein the loss value characterizes a difference between the predicted image and the training image;

determining a first latent representation and a noise image by providing the second training image to the trained encoder;

altering the first latent representation to determine a second latent representation;

determining the augmentation by providing the second latent representation and the noise image used in the training the encoder, as input to the generator; and training the machine learning system based on the augmentation; and determining a control signal based on an output signal of the trained machine learning system, wherein the output signal is determined based on the image.

12. A training system for training an encoder, wherein the encoder is configured for determining a latent representation of an image, and wherein the training system is configured to:

determine a latent representation and a noise image by providing a training image to the encoder, wherein the encoder is configured for determining a latent representation and a noise image for a provided image;

mask out parts of the noise image to determine a masked noise image;

determine a predicted image by providing the latent representation and the masked noise image to a generator of a generative adversarial network; and train the encoder by adapting parameters of the encoder based on a loss value, wherein the loss value characterizes a difference between the predicted image and the training image.

13. A control system configured to determine a control signal of an actuator using a machine learning system, wherein the machine learning system is configured for determining an output signal characterizing a classification and/or regression analysis of an image, wherein the control system is configured to:

determine a control signal based on an output signal of the machine learning system, wherein the output signal is determined based on the image, wherein the machine learning system is trained by:

determining an augmentation of a second training image by:

obtaining a trained encoder, the encoder being configured for determining a latent representation of an image, the encoder being trained by:

determining a latent representation and a noise image by providing a training image to the encoder, wherein the encoder is configured for determining a latent representation and a noise image for a provided image, masking out parts of the noise image to determine a masked noise image, determining a predicted image by providing the latent representation and the masked noise image to a generator of a generative adversarial network, and training the encoder by adapting parameters of the encoder based on a loss value, wherein the loss value characterizes a difference between the predicted image and the training image;

determining a first latent representation and a noise image by providing the second training image to the trained encoder;

altering the first latent representation to determine a second latent representation;

determining the augmentation by providing the second latent representation and the noise image used in the training the encoder, as input to the generator; and training the machine learning system based on the augmentation.

14. A non-transitory machine-readable storage medium on which is stored a computer program for training an encoder, wherein the encoder is configured for determining a latent representation of an image, and the computer program, when executed by a computer, causing the computer to train the encoder by performing the following steps:

determining a latent representation and a noise image by providing a training image to the encoder, wherein the encoder is configured for determining a latent representation and a noise image for a provided image;

masking out parts of the noise image to determine a masked noise image;

determining a predicted image by providing the latent representation and the masked noise image to a generator of a generative adversarial network; and training the encoder by adapting parameters of the encoder based on a loss value, wherein the loss value characterizes a difference between the predicted image and the training image.

* * * * *